Sept. 20, 1960   W. D. HERRICK   2,952,875
APPARATUS FOR THE DRAWING OF PLASTICS
Filed July 11, 1957
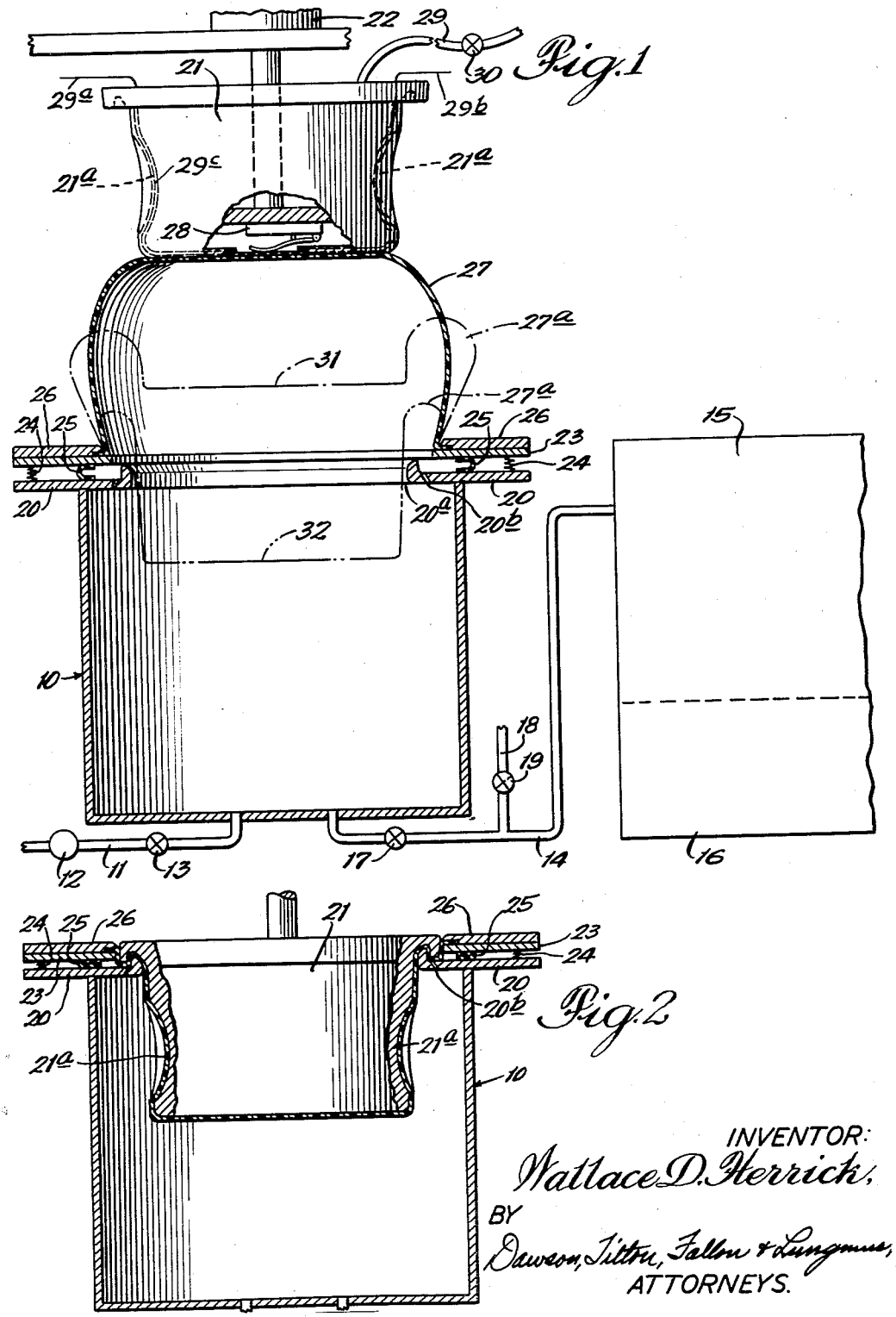
INVENTOR:
Wallace D. Herrick,
BY
Dawson, Tilton, Fallon & Lungmus,
ATTORNEYS.

2,952,875
Patented Sept. 20, 1960

2,952,875
APPARATUS FOR THE DRAWING OF PLASTICS

Wallace D. Herrick, Wichita, Kans., assignor to The Coleman Company, Inc., Wichita, Kans., a corporation of Kansas Filed July 11, 1957, Ser. No. 671,225

2 Claims. (Cl. 18—19)

This invention relates to an improvement in apparatus for the drawing of plastics and, more particularly, to a machine for the deep drawing of plastic sheets.

Deep drawing of plastic sheets can be considered to have occurred when the sheet is deformed to a depth approximately one of the planar dimensions of the sheet. One expedient for this is to first develop a bubble in the sheet and thereafter punch or press the bubble inwardly a distance almost twice its height so as to, in effect, reverse the bubble. Such a technique has also been referred to as "reverse" drawing.

To make such a technique commercially feasible, it is necessary that each successive draw result in a uniform product. Heretofore, that has not been possible. Factors such as the amount of heat introduced into the sheet, the ambient temperature, the air pressure employed to blow the bubble, the strength and thickness of the plastic blank or sheet, have all been responsible for thwarting the production of uniform products. Thus, commercial production of uniform products has been considered impracticable, and hand operation by a skilled technician can only occasionally produce products of the desired characteristics.

It is, therefore, an object of this invention to provide a novel machine that overcomes the problems and disadvantages set forth above. Another object is to provide a machine that produces successive deep drawn plastic products of uniform characteristics. Still another object is to provide a machine for the deep drawing of plastics in which the development to a certain extent of a bubble-like deformation in the plastic sheet prevents further development thereof. Yet another object is to provide a machine for deep drawing of plastic sheets in which the sides of a bubble-like deformation developed from the machine are kept from collapsing or exploding during the reverse drawing thereof. A further object is to provide a machine for the deep drawing of plastic sheets in which a sequence of operations is automatically performed in timed sequence to provide successive drawn articles of uniform character. Other objects and advantages of this invention can be seen as this specification proceeds.

This invention will be explained, in an illustrative embodiment, in conjunction with the accompanying drawing, in which—

Fig. 1 is a fragmentary elevational view, partially in section, of a machine embodying teachings of this invention and adapted for the deep drawing of plastic sheets or blanks; and Fig. 2 is a view similar to Fig. 1 but showing only a portion thereof and that portion in different operative condition.

In the illustration given, the numeral 10 designates generally a pressure tank. For ease of understanding the invention set forth herein, supporting framework, and the like, have been omitted from the drawing, but it is to be appreciated that the several operative parts of the apparatus shown in the drawing can be operatively associated through suitable structural framework. The numeral 11 indicates a compressed air line leading from a source of compressed air (not shown) to tank 10. Interposed in line 11 is a pressure regulator 12 and a valve 13. Also communicating with tank 10 is a pressure relief line 14 which, at the other end thereof, communicates with a surge tank 15, partially filled with water 16. Interposed in line 14 is valve 17 and bleed pipe 18, bleed pipe 18 being equipped with valve 19.

Secured to tank 10 about the top edge thereof is forming ring 20. Forming ring 20 is centrally apertured as at 20a to provide a port or opening through which punch 21 is adapted to pass in deep forming a plastic sheet. Again, for the sake of clarity and ease of understanding, punch 21 is shown without any supporting framework, but it is to be understood that punch 21 is associated with tank 10 and is maintained in adjustable, aligned relation therewtih. Shown above punch 21 is a fragment of a press assembly 22 employed to move punch 21 downwardly and through port 20a.

Spaced above forming ring 20 and removably supported thereon is riser member 23. Interposed between riser member 23 and forming ring 20, are springs 24 and flexible air seal 25. Mounted above riser member 23 and movable into spaced relation therewith is hold-down ring 26. Clamped between hold-down ring 26 and riser member 23 is a plastic blank 27 shown in a distended condition or bubble configuration. Blank 27, as seen in solid line in Fig. 1, abuts the bottom face of punch 21 and microswitch 28, closing microswitch 28. Microswitch 28 is electrically interconnected by means (not shown) with valve 13 to close the same.

Blank 27 is shown in various stages in Fig. 1 of reverse draw. It is important to note that only the central portion of blank 27 is in abutting contact with punch 21 so that annular upstanding portions 27a are developed in blank 27 during the downward stroke of punch 21. To equalize the air pressure within tank 10 and that within the bulges designated 27a, bleed-holes 20b are provided in forming ring 20. In Fig. 2, punch 21 is shown in its foremost position and the completed deep drawn blank also shown.

Shown in punch 21 is a female die configuration in the side faces 21a thereof which is communicated with a source of vacuum (not shown) through vacuum line 29 equipped with valve 30.

Optimum results in the operation of the apparatus shown in the drawing is achieved when tank 10 is approximately three times the volume of punch 21 and surge tank 13 is approximately ten times the volume of punch 21.

In the operation of the apparatus shown in the drawing, the plastic sheet is clamped between riser member 23 and hold-down ring 26. Riser member 23 and hold-down ring 26 are movable by apparatus not shown out of sealing relation with tank 10 to permit clearance under member 23 for the under half of a sandwich heater. The plastic sheet is then heated by a sandwich heater (not shown) for a predetermined period and at a predetermined temperature. Thereafter, the sheets brought into sealing contact with tank 10 and air pressure is introduced through line 11 into tank 10, causing the plastic sheet to be deformed into a bubble-like configuration such as is designated 27 in Fig. 1. When the height of the bubble developed in the plastic sheet abuts microswitch 28, microswitch 28 is actuated, closing valve 13 and preventing further increase in internal pressure in tank 10. Alternatively, it is possible to employ a photoelectric cell or other means responsive to the configuration of the bubble for stopping further development thereof. However, satisfactory results are obtained through responsive means such as microswitch 28, which is actuated by the height of the bubble developed in the plastic sheet.

After the further development of the bubble is stopped, punch 21 is depressed through the bubble to make a reverse draw. During this operation, air is maintained in the annular side portions or bulges 27a of the bubble due to the back pressure caused by equalization from surge tank 13. Contact is made between air in the bulges 27a and surge tank 13 through bleed holes 20b. Alternatively, the air bleed can be regulated by adjustment of bleed valve 19. When punch 21 reaches the position shown in Fig. 2, vacuum line valve 30 is open to snap the plastic sheet into any recessed contours 21a in a wall of punch 21. The blank is maintained in the condition shown in Fig. 2 until suitable cooling has occurred. Prior to retraction of punch 21, bleed valve 18 is opened to release air pressure. During the downward movement of punch 21, the surplus pressure created in tank 10 is absorbed in surge tank 15.

Thereafter, punch 21 can be withdrawn from the deep drawn plastic blank. It may be desirable in some instances to provide a source of compressed air communicating with the interior of punch 21 so as to aid in freeing the finished blank. It is also possible and desirable to have water circulated in punch 21 so as to maintain a predetermined temperature in punch 21 and, therefore, the blank on which it operates for this purpose, cooling water may be delivered to the punch 21 as through line 29a and removed therefrom through line 29b. A jacket-like channel 29c may be provided in the wall of the punch 21 to accommodate the circulation of the coolant.

I have found that determining the size and shape of the bubble are of primary importance because the bubble determines the distribution or thickness of the material, the size and thickness of the blank required, and its tendency toward webbing, all factors which might result in successive non-uniform drawn products. In some instances, it may be desirable to employ the control of the bubble configuration so as to produce a different shaped bubble prior to deep drawing. For example, by introducing a time delay into the circuit connecting microswitch 28 and valve 13, the configuration designated by the numeral 31 in Fig. 1 can be achieved without first depressing punch 21. In the illustration given, however, the numerals 31 and 32 denote, in Fig. 1, successive positions of bubble 27 after punch 21 is in the process of being lowered. The ultimate position of the bubble is designated 33 in Fig. 2.

Where a flatter bubble is desired, a delay of the character mentioned above can be employed. As the bubble touches and actuates a switch in the face of the punch, a delay is introduced into the circuit which cuts off the internal fluid pressure from the bubble so that the bubble touches the switch in the center of the punch with its apex and spreads out against a considerable portion of the bottom of the punch before pressure is released. Alternatively, control of the shape of the bubble can be achieved by the use of one or more electric eye-beams, or by one or more contact switches located in different positions so that the swell of the sides of the bubble can actuate such means for stopping the further development of the bubble.

While, in the foregoing specification, an embodiment of the invention has been shown in considerable detail for purposes of describing the invention, it will be apparent to those skilled in the art that changes may be made in the details set forth without departing from the spirit and principles of the invention.

I claim:

1. In a device for deep drawing of plastic sheets by the reverse method, a tank providing means about an opening in a wall thereof for perimetrically clamping a plastic sheet thereover, means for internally pressurizing said tank to outwardly bulge said sheet, said punch having a generally rectangular profile mounted for movement from a position spaced from said wall to a position within said tank, means in the face of said punch adjacent said tank for limiting the bulging of said sheet, said clamping means being spaced outwardly from the periphery of said opening, and bleed hole means in said wall between said periphery and said clamping means.

2. The structure of claim 1 in which means are provided in said punch adjacent said face for chilling a bubble developed from said sheet.

References Cited in the file of this patent

UNITED STATES PATENTS

| Re. 23,171 | Borkland | Nov. 29, 1949 |
| 2,468,697 | Wiley | Apr. 26, 1949 |
| 2,531,540 | Smith | Nov. 28, 1950 |

FOREIGN PATENTS

| 1,099,479 | France | Mar. 23, 1955 |
| 741,040 | Great Britain | Nov. 23, 1955 |

OTHER REFERENCES

Plastics Engineering Handbook (The Soc. of the Plastics Ind.), published by Reinhold Pub. Corp., 1954, New York (pages 144, 145 are relied upon).